Patented Oct. 24, 1950

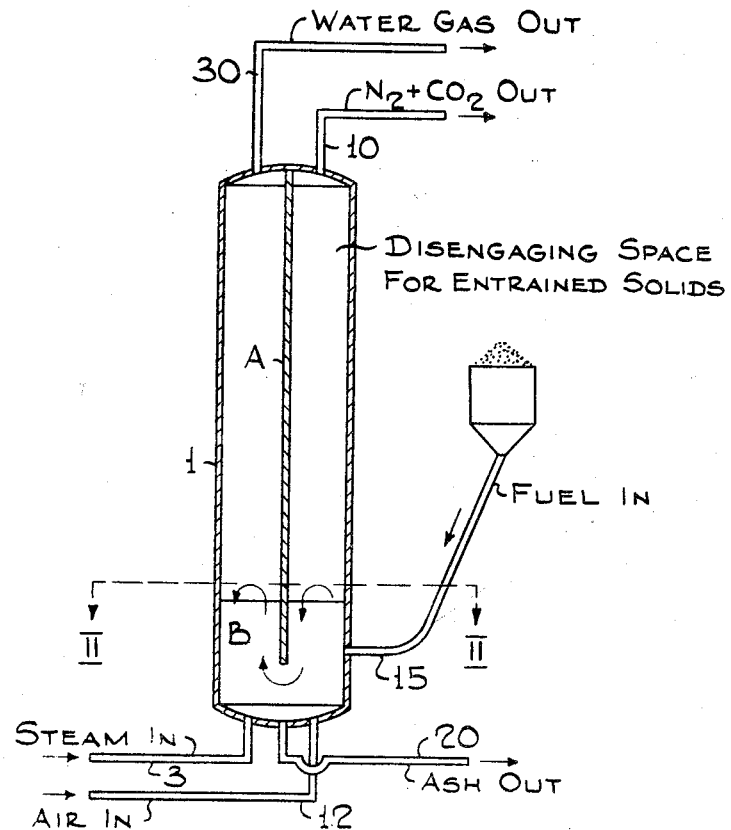
Fig. - I
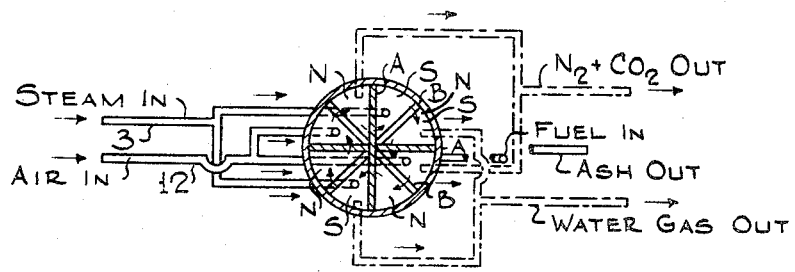
Fig. - II
Walter F. Rollman Inventor

2,527,198

UNITED STATES PATENT OFFICE 2,527,198

APPARATUS FOR GASIFYING CARBONACEOUS SOLIDS

Walter F. Rollman, Cranford, N. J., assignor to Standard Oil Development Company, a corporation of Delaware Application March 1, 1949, Serial No. 79,082

5 Claims. (Cl. 48—78)

The present invention is a continuation-in-part of co-pending application Serial No. 578,436, filed February 17, 1945, and is fully disclosed in the ensuing specification and claims considered in connection with the accompanying drawing.

One object of the present invention is to provide a means and an apparatus for carrying out chemical reactions of two types such as an oxidation (burning) and another reaction which may be endothermic, side by side, contiguously, but out of actual contact, in the same generally confined space, so that heat is carried between the reaction zones.

A more specific object of the invention is to provide a process and an apparatus for producing a mixture of carbon monoxide and hydrogen in an enlarged confined space and at the same time to cause burning of a fuel in zones which are contiguous to the carbon monoxide and hydrogen forming zones, both reactions taking place within the said confined space, and transfer of solid materials between the several reaction zones within the said confined space being effected without recourse to conduits and/or valve means.

A still further object of the invention is to provide a process and apparatus for producing a mixture of CO and $H_2$ and to burn a fuel to supply heat to support the gasification reaction, in the same enlarged confined space, but in different contiguous zones and providing means for permitting transfer of solid material from any zone to another adjacent zone without employing conduits and/or valve means.

A still further object of the invention is to provide a single vessel for the water gas reaction with internal simple vertical planes, and without valves or conduits and wherein flue and water gases are segregated and separately removed without intermixing.

The production of hydrocarbons, both gaseous and normally liquid, by catalytic synthesis using carbon monoxide and hydrogen is old. A great deal of research has been carried out in connection with this process for it affords a means of forming valuable hydrocarbons which may be converted, for example, to gasoline, heating oil, and the other products ordinarily obtained from petroleum. One of the main problems of the hydrocarbon synthesis from CO and hydrogen has been the development of an economical source of these gases. The most commonly used method of preparing carbon monoxide and hydrogen involves the reaction between steam and carbonaceous materials such as coal, coke, oil, coke oven gas, or natural gas.

In many chemical reactions, a solid catalyst is employed to promote the reaction. Thus, in cracking hydrocarbon oils, in oxidizing naphthalene, in synthesizing hydrocarbons from CO and $H_2$, a solid catalyst is used in modern practice. Heretofore, the catalyst was employed in the form of a stationary bed. But more recently, the so-called "fluidized" catalyst type of operation has come into general use. In this process, the catalyst in the form of a powder is suspended in the reaction vapors in a reaction zone and the process is chiefly characterized by the features of accurately controllable temperatures, maintenance of catalyst activity at nearly constant levels, continuity of operation and others.

The present invention relates to improvements in the "fluidized" solids type of operation and there is described hereinafter its application to the production of a mixture of CO and $H_2$, suitable as starting materials for synthesizing hydrocarbons and also its application to naphthalene oxidation, with the understanding that these two types of operations are merely illustrative of the broad principle involved and that other reactions may be successfully performed according to the teachings of this invention.

It is the main object of the invention to provide an apparatus for carrying out a fluid solids type of process in an operation involving both a productive phase and a solids reheating or recuperative phase, in a single confined space and at the same time eliminating the necessity of utilizing transfer lines, valves, and as indicated, a plurality of vessels.

Other and further objects of the invention will appear from the following detailed description and claims.

In the accompanying drawing, there are shown diagrammatically merely the essentials of an apparatus in which a preferred embodiment of the invention may be carried into practical effect in Figure I, and in Figure II, there is shown a cross section of the apparatus shown in Figure I taken along the lines II to II.

Referring in detail to Figures I and II, the generator consists of a vertical cylinder I divided by two intersecting walls A extending from the top to a point near the bottom of the vessel, thus dividing it into four zones or compartments. The generator is further divided in the lower portion thereof by two vertical walls B extending part way up from the bottom of the generator, into eight compartments or zones S. The eight chambers or zones comprise two burning chambers where carbonaceous material is burned in the presence of air to supply heat, two steaming zones in which the hot burned coke is treated with steam to form water gas and four interposed zones in which coke from a burning zone or a steaming zone passes therethrough downwardly to the bottom of an adjacent steaming or burning zone. In other words, the passage of the coke or other carbonaceous material is upwardly through the steaming and burning zones and downwardly through the interposed zones which form the communicating length between the said burning and steaming zones. Thus, steam is introduced at the bottom of two oppositely disposed chambers via feed line 3 where it contacts coke to form water gas which passes upwardly and finally exits through line 30; air is introduced via line 12 at the bottom of the two segments displaced 90° from those into which steam is introduced, causing burning of coke therein, and flue gas, consisting chiefly of $CO_2$ and nitrogen, is taken overhead through line 10. The coke or coal (which were termed "fuel") which reacts with the steam to form the water gas previously mentioned is introduced through line 15 (see Figure I). In the example chosen to illustrate the invention the coal or other carbonaceous fuel has an initial particle size of about 4 mesh.

The steam and air introduced at the bottom of the generator, as indicated, cause the fuel bed to be fluidized, and simultaneously gradually lift the fuel to the top of walls B where it spills over into the adjoining zone, passes downwardly therethrough (without reacting) and is withdrawn from the bottom thereof. It is then picked up by the rising air or steam (as the case may be) and carried into the next zone. The fuel is thus heated by combustion as it rises through an "air" chamber (or burning zone) and is cooled to a corresponding extent by the endothermic water gas reaction as it rises through a "steam" chamber or steam zone. This motion up and down the several chambers and around the lower portion of the generator continues until the fuel is consumed. Make-up fuel is, of course, added continuously. Ash produced in the process may be removed via line 20 from the chamber immediately preceding that into which fuel is introduced, and the process is adjusted so that gasification of the fuel is completed in the "steam" chamber immediately preceding that from which ash is removed.

It is understood, however, that only a portion of the ash need be withdrawn from the chamber immediately preceding that into which fuel is introduced, the balance of the ash being recycled through the system so that the material circulating consists of a mixture of ash and coal or coke. Also, it may be preferable, in the interest of maintaining a suitable reaction rate, to operate so that all of the fuel is not consumed in the reaction zone prior to that at which ash is removed, as a consequence of which a minor quantity of fuel is withdrawn with the ash.

Referring in particular to Figure II it will be noted that there are four zones N termed neutral zones, meaning that these are the zones into which the fluidized fuel spills over from an adjacent reaction zone, in which neutral zone it forms a dense phase and passes by gravity to the bottom thereof and thence through a port into the next following zone where it is picked up by either steam or air by which it is either converted to CO and $H_2$ or burned to supply heat. Therefore, the term neutral means that the zone is one in which substantially no reaction takes place.

Although the solids contained in the neutral zone will usually flow therefrom by gravity into the following adjacent reaction zone without the use of an aerating gas, somewhat as dry sand will flow out of the side of a hopper, it may be expedient to introduce a small amount of fluidizing gas at the bottom or side of the neutral zone to promote the downflow of solids therein. Any suitable gas such as steam or air, may be used, at a rate which for example may be equivalent to a velocity in the empty neutral zone of about 1 ft./sec.

With respect to the term "fluidizing" in the reaction zones there is meant a condition in which the granular or powdered fuel and ash is suspended in the gas either by steam or air to form a suspension moving generally upward but at the same time permitting a sort of delayed settling of the solid fuel. In the present disclosure in speaking of gas velocity as being say 10 ft. per second, reference is made to the velocity of the gas as if there were no solid present. Gas velocities of about 10 ft. per second where a particle size of the coke is about 4 mesh results in a suspension in these zones in which the coke moves generally upward. It moves at a slower rate than the gas and consequently there is a slippage or delayed settling which has been previously referred to. There is also, however, sufficient turbulence of the individual particles of solid fuel to permit intimate and thorough mixing throughout the zone.

The process is independent of the rate of circulation of fuel in the generator, provided merely that the rate is sufficient to insure the necessary temperature level in the water gas generation sections.

Unlike other proposed applications of the fluid solid technique to the generation of water gas, slide valves and transfer lines are not needed and only one vessel divided by simple vertical planes is required. The advantages, especially bearing in mind the high temperatures involved, are obvious.

The process described is completely continuous, requires no pure oxygen, and the CO and $H_2$ withdrawn from the generator contains only minor amounts of nitrogen and $CO_2$. The equipment is relatively simple.

The water gas which is withdrawn through line 30 may, of course, contain some powdered material, such as ash or unconsumed coal, or the like. This gas may be passed through the usual cyclone separators and/or electrical precipitators to cause the fines to be separated from the gas in equipment not shown, and then the water gas may be delivered to storage or directly to subsequent processing. There have been omitted a great many conventional engineering expedients and devices for simplicity and to direct attention to the invention and there have been shown merely the essential elements of the improvements. The skilled engineer, particularly one who is familiar with the fluid solids technique is well acquainted with the number of engineering devices, such as heat exchangers, preheating furnaces, pumps, valves, and the like which would be necessary as accessory apparatus in commercial units when used in conjunction with the features which are shown and described in this specification and drawing.

In order further to illustrate the invention, there is set forth below a typical example giving conditions and nature of the fuel and the yields so that an evaluation of the improvements may be possible.

Lignite, coke, or coal reduced to about 4 mesh is charged continuously to a generator of the type described at a rate which approximates 40 lbs./1000 cubic ft. of water gas produced. Material circulating in the system has a high ash content, and average particle size is less than as charged. The depth of the fluidized bed for the most active fuels may be on the order of five feet and gas velocity up through the bed about 10 feet per second. Air and steam rates are adjusted so that temperature in the generation zone is around 1900° F., at which condition about 8200 cubic ft. per hour of water gas is produced per square foot of generation cross-sectional area. Following is a typical analysis of water gas: 51% hydrogen, 40% CO, 3% $CO_2$, 5% $N_2$.

The particle size of the fuel may vary from a powder of say 100 mesh to a size of ¼ to ½ inch lumps. Of course, the larger the particle size the greater must be the velocity of the gases to give the fluidized condition. Therefore, the gas velocity in the steaming zone or the air zone may vary from ½ to 10 or more feet per second. However, the less active fuels may require conditions of particle size, bed depth and vapor velocity such that contact time approximates 5 to 10 seconds, compared to about 0.5 second in the example cited.

It will be understood, of course, that the specific design shown in the drawing is merely illustrative and does not impose any limitation upon the invention. Thus, where there are shown in the drawing two steaming zones and two burning zones, there may be used a greater or lesser number of zones. Thus, one may have one burning zone and one steaming zone or one may have three or more of these zones. Of course, in any case there will be needed the correct number of "down flow" zones to permit transfer of solids from one reaction zone to the next reaction zone.

It should also be pointed out that while there has been described in detail a method of preparing CO and $H_2$ that the process is not limited to this precise reaction but may be used in any number of reactions where a solid contacts gasiform material in one stage and is either cooled or regenerated in a second stage.

Numerous modifications of the invention will be apparent to those who are familiar with the art.

In the above specification and the appended claims, by the term "cylindrical sector" is meant a volume, a cross section of which is defined by two radii and the intercepted portion of the circumference of a cylinder.

What is claimed is:

1. A treating apparatus of the character described comprising in combination a cylindrical treating vessel, at least one plate extending diametrically from the top to a point above the bottom of said treating vessel, thus forming at least two cylindrical sectors in continuous open communication at their lower portion, at least one additional plate extending upwardly from the bottom of said treating vessel diametrically and at an angle to the first-named plate, the plates together thus forming a plurality of cylindrical sectors, said last-named plate extending from the bottom of said vessel to a point above the lower end of said first-named plate below the top of said vessel, conduit means for introducing finely divided solids into at least one of said cylindrical sectors, at least two separate conduit means for introducing gasiform material in said cylindrical sectors for treating said solids, means for withdrawing gasiform material from an upper portion of said treating vessel and means for withdrawing treated solids from the lower portion of said treating vessel.

2. A treating apparatus of the character described comprising in combination a cylindrical treating vessel, two vertically intersecting plates extending diametrically from the top to a point above the bottom of said treating vessel, thus forming four cylindrical sectors in continuous open communication at their lower portion, additional vertically intersecting plates extending upwardly from the bottom of said treating chamber and disposed substantially at 45° angles to said first-named two plates, said last-named plates extending a relatively short distance above the lower end of said first-named plates, whereby eight cylindrical sectors are formed, means for introducing finely divided solids into at least one of said sectors, separate conduit means for introducing gasiform material for treating said solids into each of said sectors, separate means for withdrawing gasiform material from the top of each of said four upper cylindrical sectors, and means for withdrawing treated solids from the lower portion of said treating vessel.

3. A treating apparatus of the character described comprising in combination a cylindrical treating vessel, two vertically intersecting plates extending from the top to a point above the bottom of said treating vessel, thus forming four cylindrical sectors in continuous open communication at their lower portion, additional vertically intersecting plates extending upwardly from the bottom of said treating chamber and disposed substantially at 45° angles to said first-named two plates, said last-named plates extending a relatively short distance above the lower end of said first-named plates, whereby eight cylindrical sectors are formed, means for introducing finely divided solids into at least one of said sectors, separate conduit means for introducing gasiform material for treating said solids into each of said sectors, separate means for withdrawing gasiform material from the top of each of said four upper cylindrical sectors, and means for withdrawing treated solids from the lower portion of said treating vessel.

4. A treating apparatus of the character described comprising in combination a cylindrical treating vessel, two vertically intersecting plates extending diametrically from the top to a point above the bottom of said treating vessel, thus forming four cylindrical sectors in continuous open communication at their lower portion, additional vertically intersecting plates extending upwardly from the bottom of said treating chamber and angularly disposed with respect to said first-named two plates substantially at 45° angles to said first-named two plates, said last-named plates extending a relatively short distance above the lower end of said first-named plates, whereby eight cylindrical sectors are formed, means for introducing finely divided solids into at least one of said sectors, separate conduit means for introducing gasiform material for treating said solids into each of said sectors, separate means for withdrawing gasiform material from the top of each of said four upper cylindrical sectors, and means for withdrawing treated solids from the lower portion of said treating vessel.

5. A water gas set adapted for treatment of fluidized carbonaceous solids comprising in combination a vertically disposed cylinder having eight approximately equal contiguous chambers disposed in the form of cylindrical sectors about a common axis, two of said chambers being adapted to the fluidized combustion of carbonaceous solids, two to the fluidized generation of water gas, and four to the downward passage of treated finely divided solids, the treating chambers being separated from one another by one of said solids downflow chambers, and each chamber being bounded on one side by a baffle extending from the top of said cylinder to a point near the bottom, and on another side by a baffle extending from the bottom to a point a relatively short distance above the bottom portion of said first-named baffle, means for introducing finely divided carbonaceous solids into at least one of said treating chambers, conduit means for admitting fluidizing gas into all said chambers, and means for withdrawing treated solids from the lower portion of said vessel.

WALTER F. ROLLMAN.

No references cited.